Feb. 24, 1925.
W. A. HEYMAN
1,527,304
PROCESS FOR LIQUID TREATMENT
Filed July 20, 1922
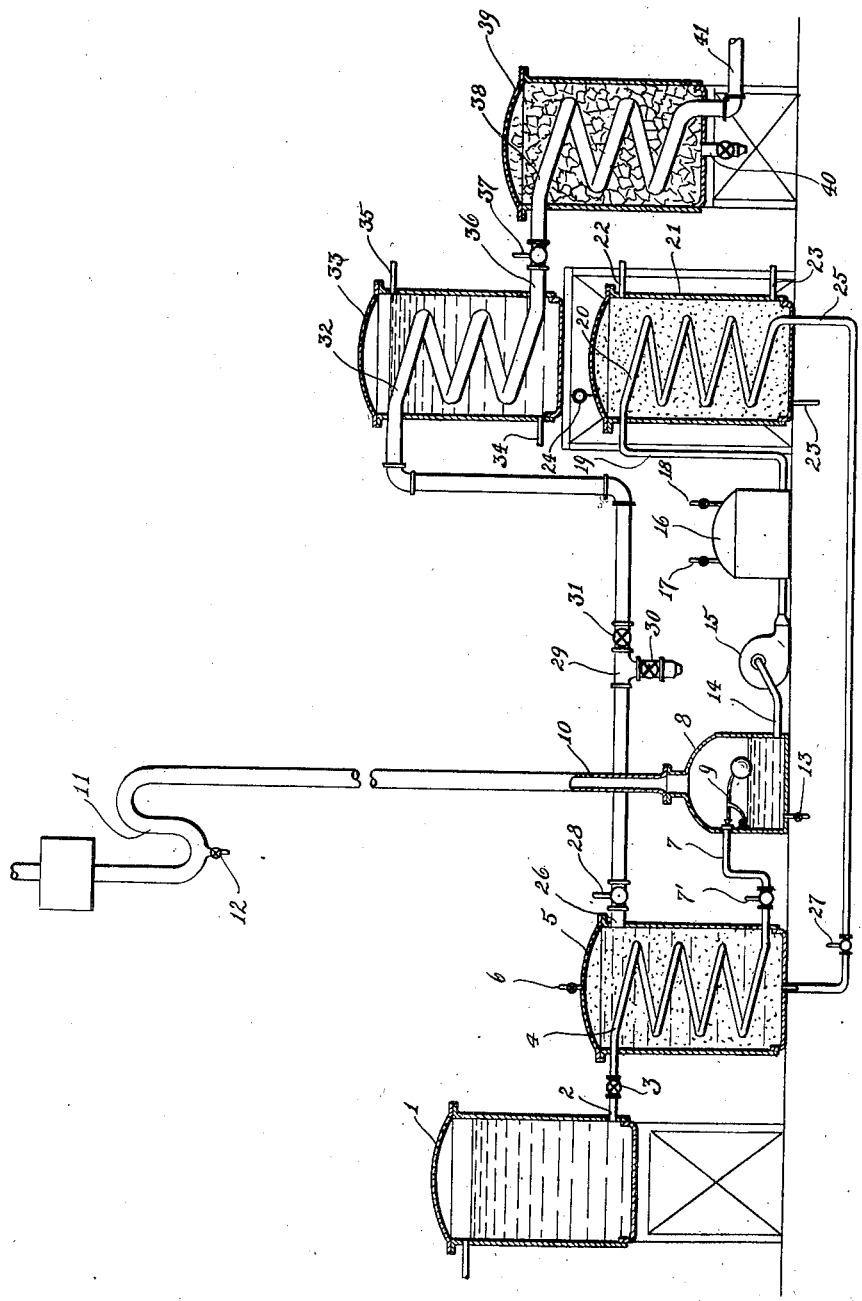
INVENTOR
WILBERT A. HEYMAN.
BY
ATTORNEY.

Patented Feb. 24, 1925.

1,527,304

UNITED STATES PATENT OFFICE.

WILBERT A. HEYMAN, OF CLINTON, LOUISIANA, ASSIGNOR TO HEYMAN PROCESS CORPORATION, OF NEW YORK, N. Y., A CORPORATION OF NEW YORK.

PROCESS FOR LIQUID TREATMENT.

Application filed July 20, 1922. Serial No. 576,191.

*To all whom it may concern:*

Be it known that I, WILBERT A. HEYMAN, residing at Clinton, Louisiana, parish of East Feliciana, have invented certain new and useful Improvements in a Process for Liquid Treatment, of which the following is a specification.

This invention relates to a process for the treatment of liquids of animal or vegetable origin and it is contemplated herein to provide a process by which such liquids useful for food purposes may be placed in a condition for indefinite preservation.

It will be understood that juices extracted from fruits of various kinds such as pineapples, grape fruit, oranges and the like, contain various constituents of a chemically delicate character, such constituents having the form of aldehydes, esters, ketones and the like. These compounds give the juice its characteristic flavor and aroma, and in the freshly extracted juice there are certain vitamine properties, the nature of which is not exactly understood but which are known to make the juice valuable for food purposes.

The flavoring principles above referred to are also valuable inasmuch as they impart to the juice its peculiar characteristics, as well as on account of their health-giving qualities. It has been found, further, that these vitamines are also present in milk, and any process for liquid treatment for purposes of preservation must be so designed and carried out that the delicate chemical compounds and the vitamines are preserved unharmed. In the case of milk it is also necessary that there be no separation of the fatty substances and milk sugars present in the milk. If a process for preservation is adopted, however, which either destroys the vitamines, breaks down the flavoring constituents or causes a separation, in the case of milk, of the sugars and fatty substances, the liquid, although in condition for preservation, is lacking in many of the essential elements which render it not only palatable and pleasant for human use, but also of health-giving properties.

It is found that such liquids, if exposed to the atmosphere, become quickly infected with bacteria, and these bacteria, if allowed to remain active, produce fermentation. In the case of the fruit juices above referred to, the delicate flavoring principles are destroyed and the fruit sugar is eventually converted into alcohols and acids. The juice thereupon loses its palatable taste and becomes unfit for human consumption.

The same chemical changes take place in the case of milk with the so-called "souring," which derives its name from the production of lactic acid. Any preservation process, therefore, by means of which liquids, as have been above mentioned, are to be placed in condition for preservation, should be capable of rendering the bacteria and other harmful life forms inactive, while at the same time preserving the essential ingredients of the liquid and the vitamines in unchanged condition.

One object of this invention, therefore, is to provide a new and improved process by means of which liquids of the type described may be placed in condition for indefinite preservation, the process being carried on without destruction or other injury to the flavoring and odoriferous principles and the vitamines.

Another object of this invention is to provide a new and improved process by means of which liquids of the type described may be placed in condition for indefinite preservation, the process being rapidly and inexpensively carried on and, furthermore, requiring no expert supervision.

Another object of the invention is to provide a process by means of which liquids of the class described may be so treated that they may be preserved indefinitely, the harmful life forms being destroyed or rendered inactive while these ingredients, which make the liquid palatable and health-giving, are preserved in their original condition.

Another object of the invention is to provide a process by means of which liquids of the type described may be placed in condition for indefinite preservation, the process requiring but a short interval of time and being continuously carried on.

Another object of the invention is to provide a process of the type described by means of which the liquid may be placed in condition for indefinite preservation by the destruction or rendering inactive of the harmful life forms, the process being carried on out of contact with the air whereby there is no oxidation or other destruction of the delicate flavoring principles and of the vitamine content.

Another object of the invention is to provide a simple and effective process for liquid treatment whereby the liquid is placed in condition for indefinite preservation, this process being capable of being continuously carried on and the liquids being maintained throughout in an atmosphere of inert sterile gas.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the single figure of the drawing, I illustrate diagrammatically a system of apparatus by which my new and improved process may be carried on, it being understood that various other forms of apparatus are suitable for this purpose so long as the treatment to which the liquid is submitted remains substantially the same.

It has been found in recent investigations as to the vitamine properties of various substances, that these vitamines are either destroyed or rendered inactive by heat and oxidation. Tests have shown that heating with exposure to the atmosphere brings about this result most rapidly and it has been further found that heating may be continued for long periods of time without such effects provided the liquid in which the vitamines reside is kept from contact with the atmosphere either by being heated in a closed container or in an atmosphere of a gas which will displace air.

These investigations have shown, furthermore, that the destructive action, so far as vitamines are concerned, is more nearly complete when the heat treatment is carried on in open vessels and that, while heating alone, that is to say, out of contact with the atmosphere, produces some destruction of the vitamines, the effect seems to be produced by oxidation by the oxygen dissolved in the liquid, rather than by the heating itself.

In regard to the destruction of the bacteria, it has been found that the cell walls of these organisms become permeable to gas when heated, the gas being admitted within the walls, especially if under pressure. The gas so absorbed will remain within the organism until there occurs a reduction in pressure, whereupon the expansion of the absorbed gas will cause the destruction of the cell walls. A decrease in temperature adds to the effect in that it causes a contraction of the cell walls which amounts, in effect, to increased pressure of the absorbed gas. With the above considerations in mind, I propose to treat the vitamine containing liquids, as above referred to, in such a way as to cause a destruction of the bacteria content, while at the same time preventing oxidation, which would not only be harmful to the vitamine but would also cause a breaking down of the flavoring or odoriferous principles.

Apparatus for the purpose above outlined is illustrated in the drawing, in which similar reference characters refer to similar parts throughout.

The reference character 1 designates a storage vessel which may be of any desired form, preferably closed, however, and disposed above the level of the succeeding apparatus so that the liquid will flow therefrom by gravity. The juice which may be extracted in any desired way, but preferably with as little exposure to the air as possible, is at once conveyed to the tank and stored therein until it may be withdrawn for treatment. Near the lower end an outlet 2 is provided, in which outlet is disposed a valve 3 so as to regulate the flow of liquid from the tank. The outlet 2 is connected with a coil 4 which may be of any suitable form and which is disposed within a closed vessel 5, this vessel being provided with an outlet 6 which permits the escape of gas, but which closes against liquid, this outlet being used for a purpose which will presently be set forth.

The coil 4, which is made in a plurality of convolutions, is connected near the bottom of the vessel 5 with an outlet 7 provided with a thermometer 7′. The outlet 7 connects with a vacuum chamber 8, in which is provided a float valve 9 which operates to close the conduit 7 when the level of the liquid within the chamber reaches a certain point, thus making it possible to keep a space above the liquid. At the upper end, the chamber 8 is provided with an exhaust pipe 10 which is connected to a suction pump, not shown, whereby a vacuum is maintained above the liquid within the chamber 8. This pipe 10 extends upwardly, preferably to a distance of approximately 32 feet, and is provided near its upper end with a trap bend 11. Ordinarily, when the process is being carried on, the suction pump will be operated to maintain a certain vacuum on the liquid, but in the event that the float valve 9 fails to operate so as to permit the chamber to be filled, the suction pump will not be able to suck the liquid through the exhaust pipe since the height is such that a perfect vacuum would not cause its overflow. The trap bend, of course, is provided to take care of condensation and to prevent the condensed liquids from running back into the chamber. The bend is provided with the usual draw-off cock 12. By providing the vacuum chamber 8, it is possible so to reduce the pressure on the liquid which has been pre-heated in the coil 4 as to cause it to boil, this ebullition assisting in freeing entrained gas.

The vacuum chamber 8 is provided at the bottom with an inlet 13 through which an inert gas such as carbon-dioxide or nitrogen may be caused to bubble through the liquid, this gas helping to free entrained air and also serving in part to throw dissolved air out of solution. As the liquid leaves the vacuum chamber 8 through the conduit 14, it is forced to the carbonator by the auxiliary pump 15 whence it is taken up by the carbonator pump and forced into the carbonator against a pressure of inert gas of preferably 100 pounds to the square inch, this gas entering by a gas inlet 18. The liquid is violently agitated by the carbonator so that each particle of spray comes in contact with the inert gas under pressure. The gas is dissolved to an extent depending upon the temperature of the liquid—the solubility of the gas and the pressure. In the case of carbon-dioxide its solubility is about 43 times that of oxygen so that any air remaining in the liquid after the previous treatment will be released by the impregnation of carbon-dioxide under pressure and during agitation. The air being lighter than carbon-dioxide rises to the top of the carbonator and may be released by well known devices through the outlet 17.

The liquid passing from the pump into the carbonator will be treated and charged with carbon-dioxide, this gas displacing the air within the liquid and also displacing air on the surface of the liquid. From the carbonator the liquid is passed through a conduit 19 into a coil 20 which lies within a closed chamber 21. A steam inlet 22 is provided near the top of the chamber 21, together with an outlet 23 for steam and condensed liquid at the bottom of the chamber 21. There is also provided a steam gauge 24 whereby the pressure within the chamber may be determined.

The coil 20 is connected with a conduit 25 which passes out of the bottom of the vessel 21 and in turn enters the bottom of the vessel 5 where the liquid passes about the convolutions of the coil 4 and is withdrawn near the top through an outlet 26. It will be seen that as steam is introduced into the chamber 21, the liquid within the coil 20 will be heated to a determined temperature, and this heated liquid passing into the vessel 5 and about the convolutions of the coil 4 will, in turn, raise the temperature of the liquid within the coil. The pressure to which the liquid has been subjected in the carbonator will be released in the tank 5 and it will be noted that the outlet 26 is of greater diameter than inlet 25. This insures the reduction in pressure previously referred to as causing a destruction of the bacteria cell walls, since the liquid in the conduit 26 will be under little back pressure. Any excess of gas will be taken off from the liquid through the escape valve 6 which, however, will not permit the liquid to overflow.

Disposed in the conduit 25 is a thermometer 27, and in conduit 26 is a thermometer 28 by means of which the temperature within the conduits may be determined. The conduit 26 is provided with a T 29 and there are positioned valves, 30 and 31, in either outlet branch of the T so that liquid may be permitted to continue through the conduit 26 or may be diverted through the T and the outlet through the valve 30.

The conduit 26 is connected at this end with a coil 32, disposed within a closed vessel 33, into which a cooling medium may be introduced through a conduit 34, this medium being withdrawn through an outlet 35. From the coil 32 the liquid flows through a conduit 36 in which is disposed a thermometer 37 and is, in turn, passed through a coil 38 disposed within a vessel 39 into which cracked ice or other cooling medium may be introduced. The vessel 39 is provided near its lower end with a draw-off connection 40 whereby the water from the melted ice may be withdrawn.

From the coil 38 the liquid issues through an outlet 41 and may be then stored within sterile containers or disposed of in any other way, as may be desired.

The carrying out of the process in accordance with the apparatus here set forth is as follows:

Assuming now that fruit juices are to be treated, the extracted juice will be led into the vessel 1 from which it may be led in desired quantities through the coil 4 and into the vacuum chamber. Some air, which may be entrained and carried along by the liquid, will be removed in the vacuum chamber both by the aid of vacuum and by the aid of the carbon-dioxide or other inert gas bubbled through the liquid at 13. Any remaining air will be displaced by the violent agitation within the carbonator where the liquid comes into intimate contact with carbon-dioxide or other inert gases. The liquid then passes through the coil 20 and steam is introduced into the vessel 21 so that the liquid within the coil will be heated. This heated liquid then passes back to the vessel 5 and gives up a part of its heat to the liquid contained in the coil 4, whereupon the partially cool liquid continues its course and is cooled in progressive steps in the vessels 33 and 39.

The rate of progress of the liquid through the apparatus and the rate of heating within the vessel 21 and of heat exchange within the vessel 4 is so balanced that the liquid within the coil 4 will be raised to a temperature of about 110° Fahrenheit, at which temperature there will be no substantial oxidation or destruction of the vitamines. Obviously, the length of the period of heating will be dependent on the rate of flow and the design of the coil, these two factors being varied as desired. The liquid thus heated is then treated to the vacuum and carbonation processes and when the air which has been entrained or dissolved within the liquid has been displaced by the inert gas, the temperature of the liquid is raised in the coil 20 to approximately 170° F. The liquid will be exposed to heating in coils 4 and 20 for about one minute. This heated liquid then gives up its heat in successive stages, first to the liquid within the coil 4 and then by the action of the cooling medium in the vessels 33 and 39, and the cooling in successive stages makes it possible to use the heated liquid for preheating purposes, as well as permitting the use of water as a cooling medium in the tank 33. The liquid will be almost to atmospheric temperature in the tank 38 and will melt only small quantities of the ice therein.

It will thus be seen that the process briefly consists of giving the liquid a preliminary heating, removing the entrained or dissolved air therefrom and displacing it with inert gas, heating the liquid so treated to a relatively high temperature and then causing the liquid to give up its heat in successive steps, a portion of the heat so given up being utilized to provide the preliminary heating referred to.

In the case of milk, the process is used without substantial modification, but it is possible to achieve different results in accordance with the temperatures to which the liquid is exposed. I have found, however, that it is desirable to use nitrogen as the inert gas in the case of milk, while either nitrogen or carbon-dioxide may be used in the case of fruit juices. Carbon-dioxide, however, has slightly acid properties which, while not undesirable in the case of the acid juices, should be avoided in the case of milk. If a simple pasteurization process then is to be carried on, the milk will be pre-heated in the vessel 4 and again heated in the vessel 21, the temperature reaching approximately 170°, it being understood, of course, that this temperature is subject to variation within limits of 20° and will, in turn, control the temperature of the preheating. If, however, it is desired to sterilize the milk completely, the preliminary heating will be carried on as before, but the heating of the gasified milk will take place at 240°. In either event, the process is carried on as has been described, the only differences being that the steam contained within the vessel 21 will be under a higher pressure and at a higher temperature in the case of the sterilization treatment.

As has been explained, the treated liquid may be withdrawn hot through the T 29 and may be introduced thereupon into suitable containers, the heat of the liquid assisting in sterilizing the container. If it is desired, however, that the liquid be cooled prior to its storage, it will be passed on through the cooling tanks provided for.

It will be seen that I have provided a process in which the liquid will be subjected to pressures and temperatures which will destroy or render inactive the harmful life forms, while preventing that oxidation which results in the destruction of the vitamines and the breaking down of the flavoring principles above referred to. I have found, further, that milk subjected to this treatment is placed in condition for indefinite preservation without any harmful effects so far as fatty substances and sugars contained therein are concerned, these being preserved without physical or chemical change.

The process, as will be noted, may be continuously carried on and the liquid moves through the apparatus without interruption. It is not necessary, as has formerly been the case, to carry on the heating in vacuum pans for long periods of time, nor is it necessary that the apparatus be given supervisory attention. Once the flow is regulated by the pump and the steam pressure adjusted to give the proper temperature within the heating coil, the process may be carried on indefinitely. The pressures and temperatures to which the liquid is exposed are sufficient to destroy or render inactive the bacteria, but in the absence of oxygen, these temperatures do not produce a destructive effect on the valuable ingredients. The liquid, therefore, as it leaves the apparatus, is in all respects similar to the freshly extracted juice or the new milk, as the case may be. It possesses the original odor, flavor and health-giving qualities and may be stored in sealed vessels for indefinite periods.

While I have described the process specifically as it would be used in connection with the treatment of fruit juices such as grapefruit juice, it may be employed without substantial change in the treatment of other juices and milk. The process is economical to carry on and large quantities of liquid may be treated in short periods of time due to the continuous operation of the apparatus. Furthermore, the necessary apparatus is of a standard form which does not require special fittings or parts.

While I have shown one form of apparatus which is thoroughly practicable for the purposes outlined, it will be observed that many changes could be made in this construction without departing from the scope of the following claims. It is intended, therefore, that all matter contained in the above description or shown in the accompanying drawing shall be interpreted as illustrative only and not in a limiting sense.

Having thus described my invention, what I claim as new and desire to secure by Letters Patent is:

1. A process of the class described for the preservation of liquids, which consists in passing the liquid out of contact with the air through a first heating chamber giving relatively lower heat and directing the liquid into a vacuum chamber, drawing the liquid from the said vacuum chamber and passing the same through a carbonator to expel air by the substitution of inert gas, then directing the liquid out of contact with external air through a second heating chamber giving relatively higher heat to the liquid, and returning the higher heated liquid to the said first heating chamber to boil the fluid which is then undergoing its initial passage through said first heating chamber, the said fluid boiling by reason of reduced pressure effected by the said vacuum chamber and thereby expelling contained air in said fluid when the vacuum chamber is reached, and after giving up part of its heat in said first heating chamber passing the liquid returned to the first chamber as aforesaid out of contact with air to cooling devices for final discharge.

2. A process of the class described for the preservation of liquids, which consists in passing the liquid out of contact with the air through a first heating chamber giving relatively lower heat and directing the liquid into a vacuum chamber, passing an inert gas upwardly through the liquid in the said vacuum chamber, drawing the liquid from the said vacuum chamber and passing the same through a carbonator to expel air by the substitution of an inert gas, then directing the liquid out of contact with external air through a second heating chamber giving relatively higher heat to the liquid, and returning the higher heated liquid to the said first heating chamber to boil the fluid which is then undergoing its initial passage through said first heating chamber, the said fluid boiling by reason of reduced pressure effected by the said vacuum chamber and thereby expelling contained air in said fluid when the said vacuum chamber is reached, and after giving up part of its heat in said first heating chamber passing the said returned liquid to cooling devices for final discharge.

In testimony whereof I affix my signature in the presence of two witnesses.

WILBERT A. HEYMAN.

Witnesses:
E. DOROTHY CONNORS,
DOROTHY WARD.